United States Patent
Beattie, Jr. et al.

(10) Patent No.: US 11,622,357 B2
(45) Date of Patent: *Apr. 4, 2023

(54) ADAPTABLE PACKET SCHEDULING FOR INTERFERENCE MITIGATION

(71) Applicants: AT&T INTELLECTUAL PROPERTY I, L.P., Atlanta, GA (US); AT&T Mobility II LLC, Atlanta, GA (US)

(72) Inventors: James Gordon Beattie, Jr., Bergenfield, NJ (US); Haywood S. Peitzer, Randolph, NJ (US); James Hollister, Camarillo, CA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 257 days.

This patent is subject to a terminal disclaimer.

(21) Appl. No.: 17/017,153

(22) Filed: Sep. 10, 2020

(65) Prior Publication Data

US 2020/0413417 A1    Dec. 31, 2020

Related U.S. Application Data

(63) Continuation of application No. 15/978,942, filed on May 14, 2018, now Pat. No. 10,805,935.

(51) Int. Cl.
*H04W 72/08*    (2009.01)
*H04W 24/02*    (2009.01)
*H04W 72/04*    (2023.01)

(52) U.S. Cl.
CPC ......... *H04W 72/082* (2013.01); *H04W 24/02* (2013.01); *H04W 72/0406* (2013.01)

(58) Field of Classification Search
None
See application file for complete search history.

(56) References Cited

U.S. PATENT DOCUMENTS 9,408,210 B2    8/2016  Pikhletsky et al.
9,559,798 B2    1/2017  Nuss et al.
(Continued)

OTHER PUBLICATIONS

Non-Final Office Action received for U.S. Appl. No. 15/978,942 dated Aug. 8, 2019, 21 pages.
(Continued)

*Primary Examiner* — Chi H Pham
*Assistant Examiner* — Raul Rivas
(74) *Attorney, Agent, or Firm* — Amin, Turocy & Watson, LLP

(57) ABSTRACT

Adaptive packet scheduling for interference mitigation is disclosed. Current spectral information can be compared to historical spectral information to determine a likelihood of a future interference event. Based on the furfure interference event, a data frame can be adapted to mitigate the effect of the future interference event on wireless communication. The interference event can be related to an unintentional interference source that can have distinct interference characteristics distinguishing it from an intentional interference source. Comparison can be facilitated by a data store storing historical interference information related to one or more historical interference events.

20 Claims, 10 Drawing Sheets

(56) References Cited

U.S. PATENT DOCUMENTS

| | | |
|---|---|---|
| 9,723,616 B2 | 8/2017 | Chimpu et al. |
| 9,729,196 B2 | 8/2017 | Abdelmonem |
| 9,755,812 B2 | 9/2017 | Kinnunen et al. |
| 9,826,422 B2 | 11/2017 | Grinshpun et al. |
| 2007/0080152 A1* | 4/2007 | Albrecht .............. B23K 9/1087 219/130.01 |
| 2015/0131537 A1 | 5/2015 | Chiang et al. |
| 2016/0270089 A1 | 9/2016 | Olfat et al. |
| 2017/0064591 A1 | 3/2017 | Padfield et al. |
| 2017/0171757 A1 | 6/2017 | Smith |
| 2017/0265189 A1 | 9/2017 | Stephenne et al. |

OTHER PUBLICATIONS

Final Office Action received for U.S. Appl. No. 15/978,942 dated Feb. 21, 2019, 19 pages.
Nokia Scheduler, Nokia Networks, May 11, 2016, 52 pages.

* cited by examiner

ADAPTABLE PACKET SCHEDULING FOR INTERFERENCE MITIGATION

RELATED APPLICATION

The subject patent application is a continuation of, and claims priority to, U.S. patent application Ser. No. 15/978,942 (now U.S. Pat. No. 10,805,935), filed May 14, 2018, and entitled "ADAPTABLE PACKET SCHEDULING FOR INTERFERENCE MITIGATION," the entirety of which application is hereby incorporated by reference herein.

TECHNICAL FIELD

The disclosed subject matter relates to adaptation of data transmission parameters in response to determining interference, for example, enabling adaptive packet scheduling, adaptive modulation or coding schema, etc., in response to a prediction of interference based on historical interference patterns.

BACKGROUND

By way of brief background, conventional interference (IX) mitigation technologies have largely focused on addressing mitigating the effects of interferers associated with overlapping wireless coverage areas, e.g., where multiple wireless networks provide coverage to the same area, these multiple wireless networks can interfere with communications links. In an aspect, this type of IX mitigation is addressed in self-organizing network (SON) technologies, automatic neighbor relations (ANR) technologies, etc. However, interferes in this type of IX mitigation typically can be associated with mitigating IX in defined spectral conditions, e.g., a first transmission via a first wireless link can be in a well characterized spectral domain such that a second transmission via a second wireless link can be adapted to better coexist with the first wireless link via sharing of the time/frequency domain, avoidance of well characterized time/frequency blocks, etc. In an aspect, these types of IX can be termed 'intentional interference' inasmuch as the several transmissions are intentionally constrained to the well characterized spectrum, which can enable other transmissions to be designed to operate in a cooperative manner.

In contrast, 'unintentional interference' can occur in typically less well characterized spectrum. This unintentional interference, hereinafter simply 'interference' or 'IX' can be associated with frequency drift, irregular temporal occurrence, wide bandwidths, high power, harmonics, intermodulation effects, etc. As an example, a mass transit power rail switching can cause IX that can occur in conjunction with a train schedule, an airport radar can be significantly higher in power than a wireless network base station, an automobile manufacturing plant can have a welding assembly line that causes a time shifting IX having an initial narrow bandwidth that becomes wider over time due to the startup frequency being different than the continuing weld frequency, etc. Mitigation techniques for unintentional interference is generally limited due to the difficulty in characterizing the many IX forms.

For modern wireless technologies, e.g., 4G/LTE-based networks, future 5G and AirGig networks, etc., it is important to improve interference avoidance technologies with regard to unintentional interference. In an aspect, interference avoidance technology for unintentional interference can be very important in the uplink packet scheduler where the uplink transmission is generally less robust than a corresponding downlink transmission, although the same or similar techniques can also be employed in downlink transmission IX mitigation. Moreover, current closed-loop type IX mitigation is expected to become overly cumbersome as wireless spectrum becomes increasingly crowded.

DETAILED DESCRIPTION

Figure 1:
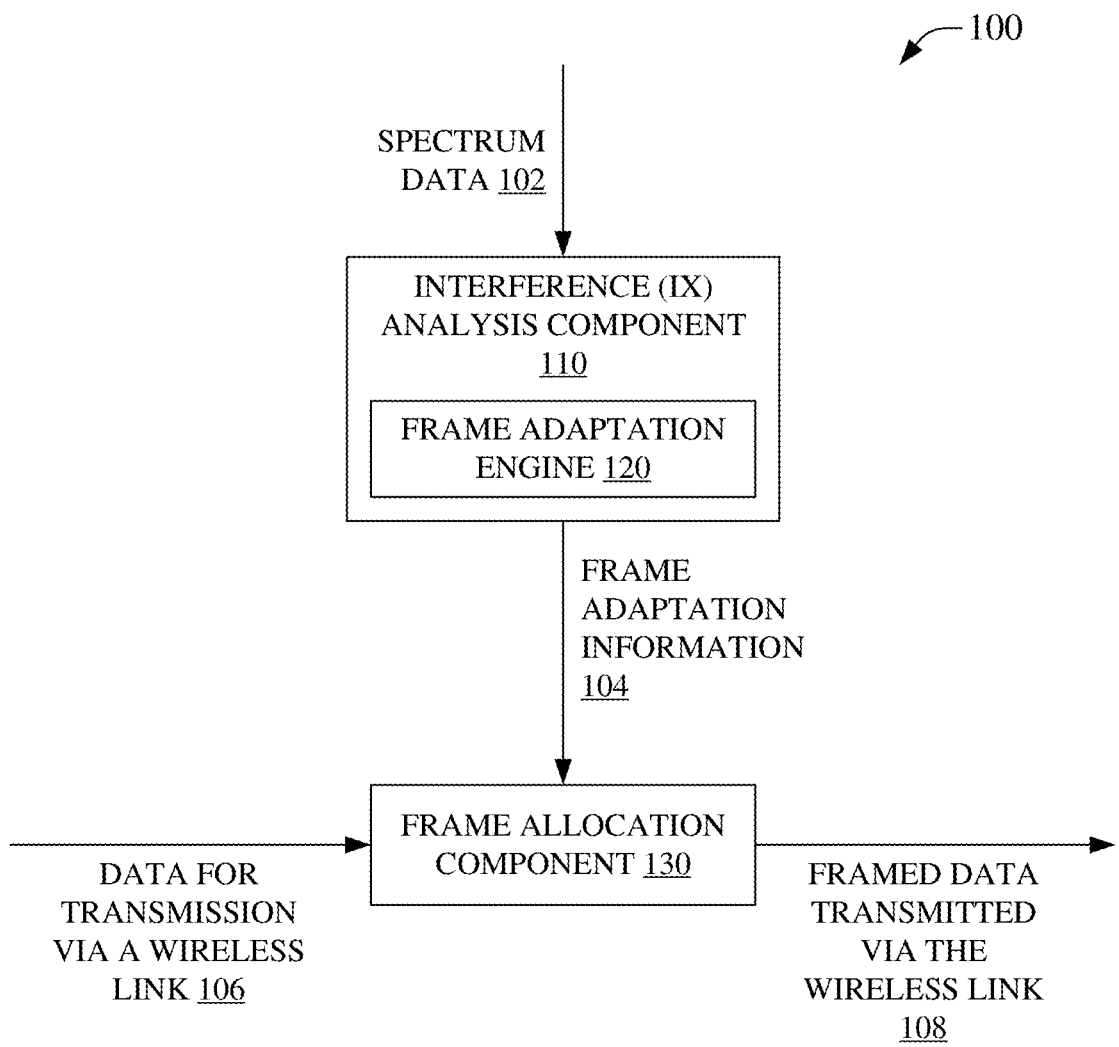
FIG. 1 is an illustration of an example system that can enable mitigation of interference based on analysis of spectrum data, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional IX mitigation technology is generally better understood for intentional interferences in contrast to unintentional interferences. Further, many current IX mitigation technologies employ closed-loop techniques that are generally slow in comparison to frame rates and can become increasingly cumbersome as spectrum becomes increasingly crowded. Accordingly, new technologies for adapting wireless transmission in view of unintentional interference can be increasingly important to sustainability of efficient wireless networks.

Today, 5, 10 and 20 MHz carrier uplink channels can be routinely impaired by unintentional interferes, e.g., steady-state carriers, transient carriers, corresponding harmonics or intermodulation products, as well as other apparently random noise sources. These degrading signals can impair service on one or more connections depending on the spectral frequency, persistence, cycle time and strength of the interfering signal or signals. While mitigation of these types of IX can be challenging to resolve in the context of the bandwidths currently in use, future proposed bandwidths, e.g., 300 MHz, 800 MHz, or more, such as are proposed for use in 5G and AirGig networks, can be even more exposure to impairment from these types of interfering signals. A further challenge typical of current technology can relate to PRB s or frames typically being sent every 0.5 millisecond. However, it can take significantly more time, e.g., as long as 8-10 milliseconds, etc., to process scheduler changes to PRBs and then further additional time to communicate these changes on a downlink and process it at a user equipment (UE). As an example, where these timing values are currently being applied to bandwidths up to 20 MHz, it readily becomes apparent that a larger, and possibly more complex, processing load can result for a channel of 800 MHz or more in bandwidth. It can be anticipated that there will be diverse user applications and possibly even more UEs sharing any given channel, resulting in demands that outstrip the current closed-loop technologies.

In an aspect, the disclosed subject matter provides for IX mitigation related to unintentional interference. In an aspect, updates to physical resource blocks (PRBs), modulation and coding schemes (MCSs), etc., can be provided based on what interference is predicted to happen on a channel, e.g., an uplink channel, a downlink channel, or both an uplink and a downlink channel. Predictions for future interference can be predicated on current PRBs and analysis of historical IX, e.g., a 'fingerprint' of IX can be determined and stored in a library, catalog, database, etc., and a current observation of PRB interference, area environmental conditions, temporal features, etc., can be employed to identify a likely future interference. As an example, an airport can turn on a particular radar system when weather is poor, which would typically be off during good weather. Moreover, the example radar can have been characterized and stored. Similarly, a mitigation for the effects of this example IX can be stored. Accordingly, in this example, worsening weather conditions an observation of signature features associated with the example radar being started can be used to 'predict' that the radar will go into use, such that the stored mitigation scheme can be implemented. In an aspect, the weather and the signature features of the example radar starting up can be employed by a device in comparisons to different characterized IXs stored in the catalog/database/library of IXs, thereby enabling access to a correlated IX mitigation scheme. In embodiments, the comparison can result in a score or ranking of likely IXs and corresponding mitigations, such that a selected IX mitigation is more likely to be a better IX mitigation than another lower scored or lower ranked IX mitigation.

Predictions can be made by looking for patterns in the interfering signals and leveraging those patterns to provide predictive channel and PRB use information to a UE in a corresponding service coverage area. Information can be gathered from devices in a service coverage area, e.g., from UEs, base stations, etc., and from other sectors serving the same or other areas. The information can represent a signature, pattern, etc., that can contain bandwidth, frequency, strength, or nearly any other aspect of a waveform over time, and can be adapted or revised over time. This information can allow a packet scheduler to, in an aspect, anticipate when high or low utilization of particular frequency segments/PRBs, timeslot, etc., will likely be possible. This technology can improve effective channel use, e.g., in high-bandwidth, high-density, wireless and wired transmission systems. Increased channel utilization and bandwidth requirements expected as spectrum becomes increasing crowed can be improved via the disclosed predictive element in either, or both, the uplink utilization feedback loop or downlink utilization loop to improve data flow efficiency via interference mitigation, avoidance, compensation, etc., and can also be associated with reduced application layer errors, retries, cost, etc.

Patterns for signatures can be based on any number of algorithms, e.g., where idle interval measurements of average noise within a PRB segment can be based on long-term trends, short-term trends, coupled with predictive elements from neighbor sector data, etc., that can be collected and correlated. One or more of these elements can be weighted in an adaptive and predictive algorithm whereby the variability of the time interval of the processed measurements, correlations and revised PRB assignments and related MCSs can be combined, e.g., in a cloud based environment, a machine-learning environment, etc. This can provide a scalable approach that can allow for the conservation of capabilities and their subsequent application to critical areas where change in both noise and usage can be more common, which can result in an overall more efficient application of resources.

The presently disclosed subject matter can, in embodiments, aid in reducing losses due to feedback latency common to closed loop systems. As transmission speeds increase, closed-loop feedback, such as those which can rely on channel quality index (CQI), etc., can be overly inefficient and can require augmentation to reflect nuanced optimizations that can be obtained through adaptive and predictive signal signature analysis and a reference library of interference signatures, such as is presently disclosed for unintentional interferences.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100 that can enable mitigation of interference based on analysis of spectrum data, in accordance with aspects of the subject disclosure. System 100 can comprise interference (IX) analysis component 110 that can receive spectrum data 102. In an aspect, spectrum data 102 can comprise IX information corresponding to unintentional interference. Unintentional interference can be associated with characteristics that are typically distinct from intentional interference, e.g., characteristics such as frequency drift, irregular temporal occurrence, wide bandwidths, high power, harmonics, intermodulation effects, etc. As an example, a switching for a mass transit power rail can cause IX that can occur in temporal conjunction with a train movement along routes and according to a train schedule, an airport radar can be significantly higher in power than a wireless network base station, an automobile manufacturing plant can have a welding assembly line that causes a time shifting IX having an initial narrow bandwidth that becomes broader and shifts over time due to the startup frequency being different than the continuing weld frequency, etc. Accordingly, IX analysis component 110 can determine IX information based on spectrum data 102. In an aspect, IX information can embody a characteristic of unintentional interference, e.g., a pattern, signature, etc., that can correspond to unintentional interference present in an area, e.g., a service coverage area of a wireless network system. As an example, a welding assembly line can generate a plurality of interferences, wherein each interference changes in time, frequency, power, and bandwidth, for example as illustrated at 400 in FIG. 4. The example welding assembly line can comprise, for example, an inference that begins at a higher and narrower frequency that, over time, shifts to a lower and broader frequency, such as 401 or 402 of FIG. 4. This type of changing character can be distinct from typical interferences from intentional interferers. Further, this type of characteristic can be determined in an analysis performed by IX analysis component 110.

IX analysis component 110 can comprise frame adaptation engine 120, that can determine an adaptation of a frame, PRB, MCS, etc., based on the analysis of spectrum data 102 by IX analysis component 110. As an example, frame adaptation engine 120 can determine that elements of a PRB not use particular frequencies at a future time due to the likelihood of interference from an unintentional interferer. Moreover, frame adaptation engine 120 can determine that successive PRBs not use different particular frequencies at other future times based on a changing characteristic of an interference, e.g., continuing the welding example, where the frequency drops and broadens over time, frame adaptation engine 120 can adapt use of corresponding frequencies in successive PRBs. In this example, it will be noted that where spectrum data 102 comprises an indication of the start of a welding cycle, frames corresponding the balance of the welding cycle can be mitigated by predicting, via IX analysis component 110, future interference based on the expected drop and broadening of the interference from the welder, such that frame adaption engine 120 can adapt corresponding successive PRBs accordingly to enable mitigation of interference from the welder. It will further be noted, that where the welder is operating cyclically, in a manner that can be employed to generate an inference relating to future cyclic use, successive cycles of welder interference can also be mitigated by frame adaptation engine 120, e.g., the predicted welding cycle, not just the balance of a detected start to a welding cycle, can be mitigated based on an inference of the likely upcoming welding cycle and the likely pattern of interference expected during that upcoming welding cycle. In an aspect, IX analysis component 110 can generate frame adaptation information 104.

Frame adaptation information 104 can embody a frame adaptation as can be determined by frame adaptation engine 120. Frame adaptation information 104 can be received by frame allocation component 130 of system 100. Frame allocation component 130 can receive data to be transmitted via a wireless link 106, hereinafter 'data' 106, e.g., data to be sent via the uplink, downlink, or both. Frame allocation component 130 can allocate a frame, PRB, etc., based on frame adaptation information 104 that can carry data 106 via framed data transmitted via the wireless link 108, hereinafter 'data' 108. In an aspect, frame allocation component 130 can be embodied in a packet scheduler, in a UE, etc., though it is depicted generally herein merely as a convenience and to preserve the full scope of the present disclosure.

In an embodiment, IX analysis component 110 can be located remotely from frame allocation component 130 and frame adaptation information 104 can be communicated over a communication framework, not illustrated. As an example, IX analysis component 110 can be located in network device such as a NodeB, eNodeB, other RAN, femtocell, picocell, network gateway device, core-network component, etc. In another example, frame allocation component 130 can be located in UE or other consumer-side device and can receive frame adaptation information 104 via a wired or wireless link. In an embodiment, IX analysis component 110 can be located local to frame allocation component 130 and frame adaptation information 104 can be communicated over a communication framework, not illustrated. As an example, IX analysis component 110 and frame allocation component 130 can be located in network device such as a NodeB, eNodeB, other RAN, femtocell, picocell, network gateway device, core-network component, etc., such as where the network device employs a wireless link to other network devices and that wireless link can be subjected to the unintentional interference.

Figure 2:
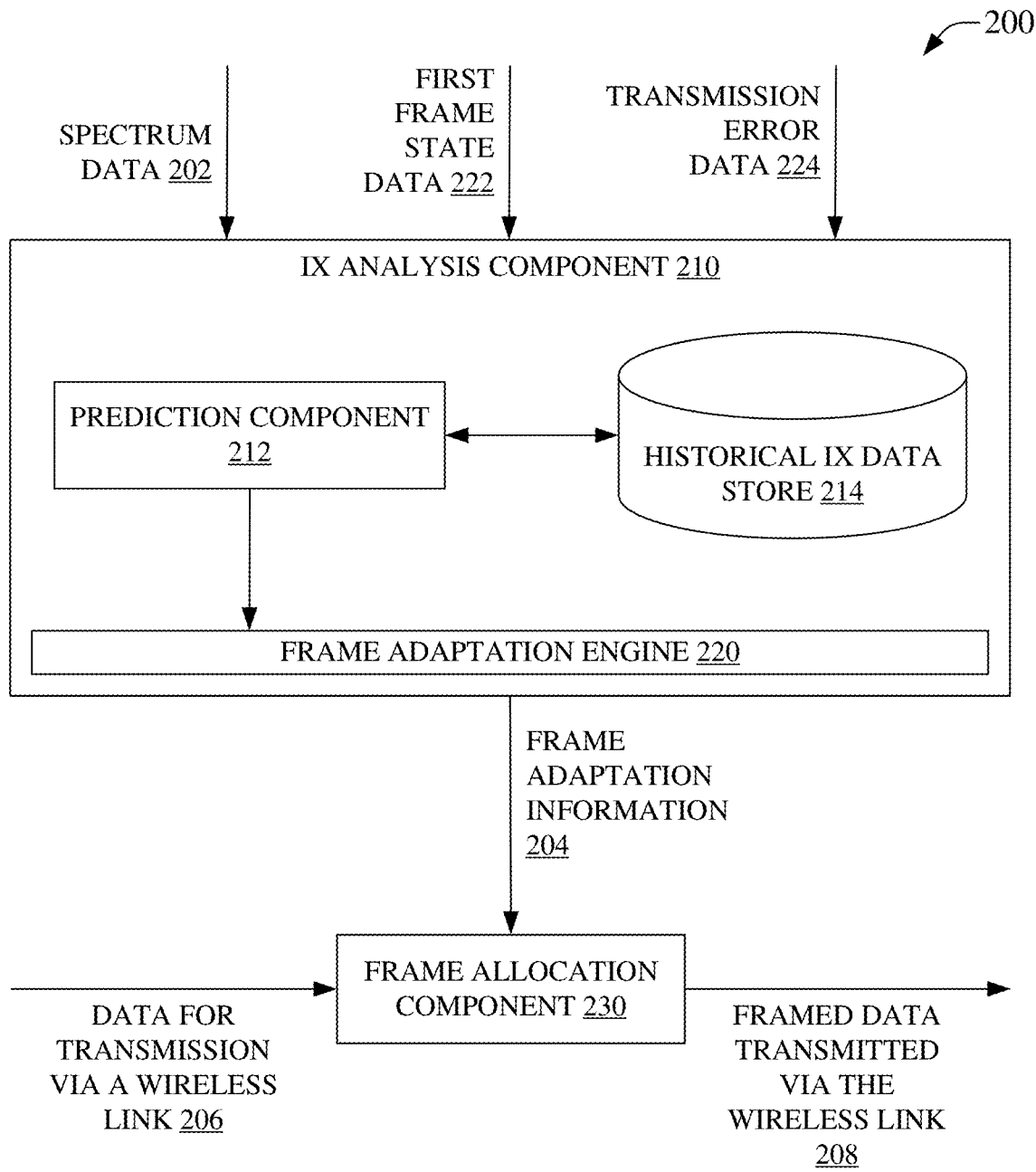
FIG. 2 is an illustration of an example system that can facilitate mitigation of interference based on analysis of spectrum data and prediction of future interference, in accordance with aspects of the subject disclosure.

FIG. 2 is an illustration of a system 200, which can facilitate mitigation of interference based on analysis of spectrum data and prediction of future interference, in accordance with aspects of the subject disclosure. System 200 can comprise IX analysis component 210 that can receive spectrum data 202. In an aspect, spectrum data 202 can comprise IX information corresponding to unintentional interference. Unintentional interference can be associated with characteristics that are typically distinct from intentional interference. In an aspect, interference avoidance, mitigation, etc., in regard to unintentional interference can be important in the uplink packet scheduler where the uplink transmission is generally less robust than a corresponding downlink transmission, although the same or similar techniques can also be employed in downlink transmission IX avoidance, mitigation, etc. Accordingly, IX analysis component 210 can determine IX information based on spectrum data 202. In an aspect, IX information can embody a characteristic of unintentional interference, e.g., a pattern, signature, etc., that can correspond to unintentional interference present in an area, e.g., a service coverage area of a wireless network system. These patterns, signatures, etc., e.g., changing character of the interferer, can be distinct from typical interferences from intentional interferers. Further, this type of characteristic can be determined in an analysis performed by IX analysis component 210.

IX analysis component 210 can further receive first frame state data 222 that can depict a first frame state for a frame that can communicate data from/to a device, e.g., a UE, etc. IX analysis component 210 can additionally receive transmission error data 224 that can indicate errors in transmission of frames from/to a device, e.g., a UE, etc. The analysis of spectrum data 202 by IX analysis component 210 can be augmented by first frame stat data 22 and transmission error data 224. This augmentation can comprise determining which elements of a frame, based on the first frame state indicated in first frame state data 222, are being employed and can further comprise determining which elements of the frame can be subject to error based on transmission error data 224. This can facilitate determining a pattern, signature, etc., for possible interference. As an example, spectrum data 202 can indicate detected occupation, e.g., by suspected inference, at a first frequency band, while first frame state data 222 can indicate that the first frequency band is, at least in part, represented in a frame by one or more frame elements, and transmission error data 224 can indicate that some, none, or all of the first frequency band is actually causing errors in transmission of data via the frame. Accordingly, the presence of a suspected interference in a frequency region may not always result in an actual error, the portions of the frequency region may not actually be used in the first frame state, etc. As such, where the suspected inference doesn't actually interfere, adaptation of frames can be avoided. Moreover, even where frame adaption can be avoided, the characteristics of the suspected interference can be analyzed and stored, and similarly a corresponding mitigation can be stored, to enable lookup of the interference and/or mitigation based on detection of a characteristic of the characteristics at a future time.

IX analysis component 210 can further comprise historical IX data store 214 that can store data corresponding to analysis of spectrum data 202. Of note, historical IX data store 214 is illustrated as part of IX analysis component 210, but other embodiments can have historical IX data store 214 located external to, or even remotely located from, IX analysis component 210 without departing from the scope of the instant disclosure. Historical IX data store 214 can store patterns/fingerprints/signatures of suspected interference. Further, historical IX data store 214 can store corresponding mitigations for suspected interferences. As such, IX analysis component 210 can compare an analysis of spectrum data 202 against stored patterns/fingerprints/signatures to determine a likely interference (or can store the analysis of spectrum data 202), such that a mitigation for the determined likely interference can be retrieved.

IX analysis component 210 can further comprise prediction component 212. Prediction component 212 can communicate with historical IX data store 214. In an aspect, analysis of spectrum data 202 via IX analysis component 210 can be employed by prediction component 212 to determine a likely interference that can occur at a future time. As an example, where an inference pattern for the earlier welder example is stored at historical IX data store 214, e.g., a pattern that starts a narrow bandwidth centered at a first frequency that, over time, increases in bandwidth and shifts the centered frequency to a lower frequency, etc., prediction component 212 can receive analysis of spectrum data 202 indicating a sufficiently similar narrow bandwidth indication sufficiently near the first frequency, and can determine/predict that this likely interference will over time shift to a lower frequency with an increase in bandwidth based on the stored pattern for the example welder. Prediction component 212 can, in some embodiments, then access a corresponding mitigation and communicate the likely interference pattern and/or the mitigation to frame adaptation engine 220.

Frame adaptation engine 220, can determine an adaptation of a frame based on the likely interference pattern and/or the mitigation received form prediction component 212. As an example, frame adaptation engine 220 can determine that elements of a PRB are not provisioned for frequencies that can be subject to interference from the likely interference at a future time. Moreover, frame adaptation engine 220 can determine that successive PRBs also not use other frequencies at other future times, e.g., based on a changing characteristic of an interference, e.g., continuing the welding example, where the frequency drops and broadens over time, frame adaptation engine 220 can adapt use of corresponding frequencies in successive PRBs. In an aspect, IX analysis component 210 can generate frame adaptation information 204 based on the operation of frame adaptation engine 220.

Frame adaptation information 204 can embody a frame adaptation as can be determined by frame adaptation engine 220. Frame adaptation information 204 can be received by frame allocation component 230 of system 200. Frame allocation component 230 can receive data to be transmitted via a wireless link 206, hereinafter 'data' 206, e.g., data to be sent via the uplink, downlink, or both. Frame allocation component 230 can allocate a frame based on frame adaptation information 204 that can carry data 206 via framed data transmitted via the wireless link 208. In an embodiment, IX analysis component 210 can be located remotely from frame allocation component 230 and frame adaptation information 204 can be communicated over a communication framework, not illustrated. In an embodiment, IX analysis component 210 can be located local to frame allocation component 230 and frame adaptation information 204 can be communicated over a communication framework, not illustrated.

Figure 3:
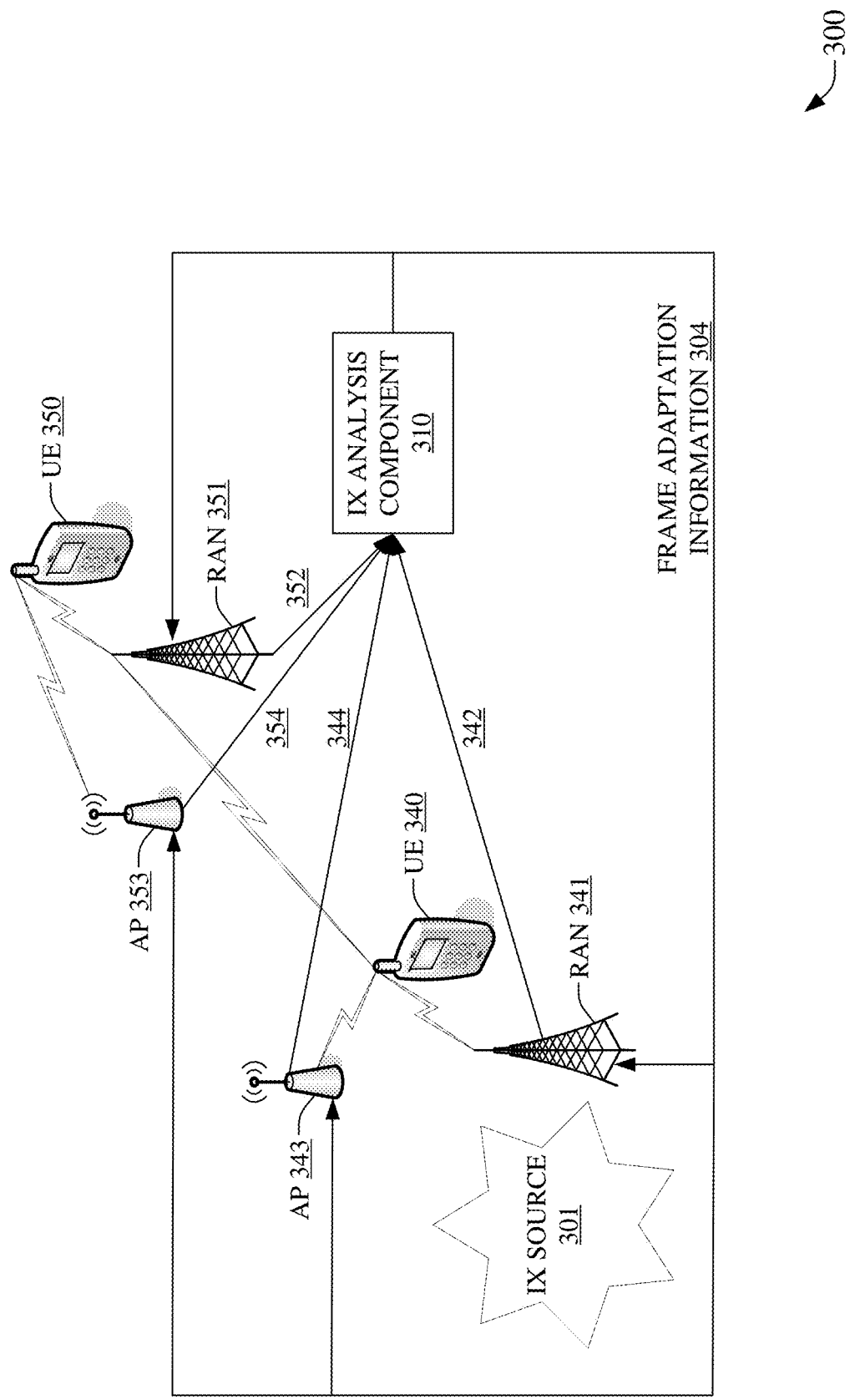
FIG. 3 is an illustration of an example system that can enable mitigation of interference based on spectrum data corresponding to different coverage areas, in accordance with aspects of the subject disclosure.

FIG. 3 is an illustration of a system 300 that can enable mitigation of interference based on spectrum data corresponding to different coverage areas, in accordance with aspects of the subject disclosure. System 300 can comprise IX analysis component 310. IX analysis component 310 can receive spectrum data 342, 344, 352, 354, etc., respectively from radio access network device (RAN) 341, access point (AP) 343, RAN 351, AP 353, etc. In an aspect, spectrum data 342, 344, 352, 354, etc., can comprise IX information corresponding to unintentional interference from IX source 301. Unintentional interference can be associated with characteristics that are typically distinct from intentional interference. In an aspect, the effect of interference from IX source 301 can decrease with distance, e.g., IX source 301 can affect transmissions between RAN 341 and UE 340 more strongly than between RAN 351 and UE 340 which, in turn can be affected more strongly than between RAN 351 and UE 350, etc.

In an aspect, interference avoidance, mitigation, etc., in regard to unintentional interference can be important in the uplink packet scheduler where the uplink transmission is generally less robust than a corresponding downlink transmission, although the same or similar techniques can also be employed in downlink transmission IX avoidance, mitigation, etc. Accordingly, IX analysis component 310 can determine IX information based on spectrum data 342, 344, 352, 354, etc. In an aspect, IX information can embody a characteristic of unintentional interference, e.g., a pattern, signature, etc., that can correspond to unintentional interference present in an area, e.g., a service coverage area of a wireless network system. These patterns, signatures, etc., e.g., changing character of the interferer, can be distinct from typical interferences from intentional interferers. Further, this type of characteristic can be determined in an analysis performed by IX analysis component 310.

In an aspect, IX analysis component 310 can generate frame adaptation information 304. Frame adaptation information 304 can facilitate adaptation of a frame used in communication between UE 340, 350, etc., and other devices, e.g., RAN 341, AP 343, etc., to facilitate mitigation of interference from IX source 301 on data transmission over a wireless link. Frame adaptation information 304 can be received by RAN 341, AP 343, RAN 351, AP 353, etc. These devices can adapt frames based on frame adaption information 304. In some embodiments, frame adaptation information 304 can be received by UE 340, 350, etc., either directly from IX analysis component 310, or via a wireless link to one or more of RAN 341, AP 343, RAN 351, AP 353, etc., not illustrated for clarity. As an example, UE 351 can use received frame adaptation information 304 to modify a future frame for uplink data transmission to AP 353. In another example, RAN 341 can use frame adaptation information 304 to adapt a frame used for downlink data transmission to UE 340. It will be noted that different devices can receive the same, similar, or different frame adaptation information 304, e.g., the information can correspond to the device receiving it, regardless of frame adaptation information 304 being illustrated as a branched communication to reduce the complexity of the illustration. In an aspect, frame adaptation information 304 can be employed by a packet scheduler of a device, e.g., RAN 341, AP 343, RAN 351, AP 353, UE 340, UE 350, etc., to adapt frames used for data communication by the device.

In an embodiment, IX analysis component 310 can employ spectrum data from different devices, e.g., spectrum data 342, 344, 352, 354, etc., in determining frame adaptation information 304. As an example, the effect of IX source 301 on a wireless link between AP 343 and UE 340 can be analyzed by IX analysis component 310 and employed in frame adaptation information 304 relative to another wireless link between RAN 351 and UE 350. As another example, the effect of IX source 301 on a wireless link between RAN 341 and UE 340 can be analyzed by IX analysis component 310 and employed in frame adaptation information 304 relative to another wireless link between RAN 351 and UE 340, such as to allow frame adaptation relative to the position of UE 340 as it moves between RAN 341 and RAN 352, etc. In an aspect, the use of spectrum data from other devices can facilitate mitigating interference for devices moving into an affected wireless service area, etc., and, in an embodiment, can allow the frame adaption to be delivered to the device prior to the device actually needing to use it.

Figure 4:
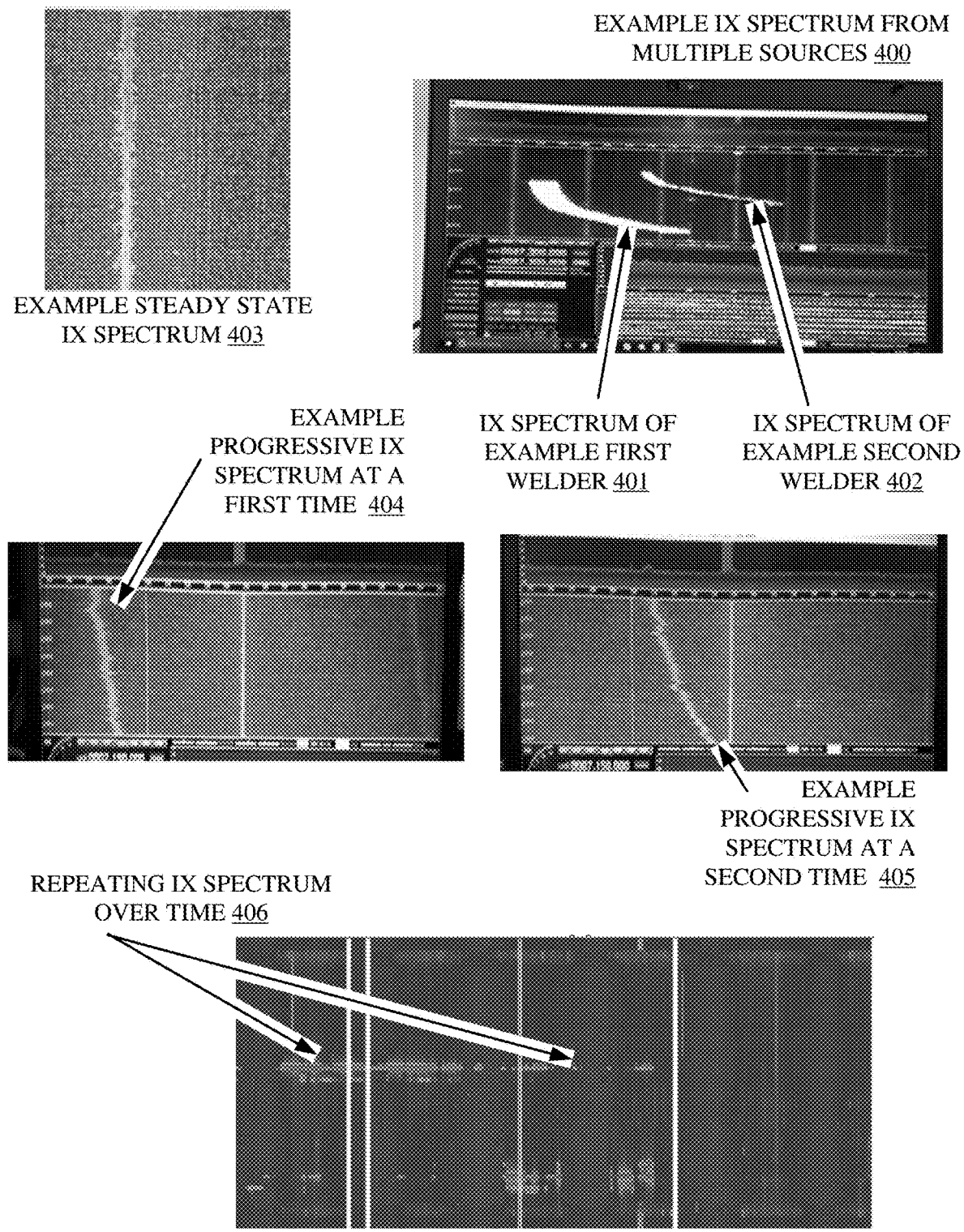
FIG. 4 illustrates examples of interference characteristics that enable mitigation of interference based on analysis of spectrum data and prediction of future interference, in accordance with aspects of the subject disclosure.

FIG. 4 is an illustration of example interference characteristics, e.g., 400-406, which can facilitate mitigation of interference based on analysis of spectrum data and prediction of future interference, in accordance with aspects of the subject disclosure. Example IX spectrum from multiple sources 400 can illustrate spectral occupation by multiple possible interferers. Example IX spectrum from multiple sources 400 can illustrate IX spectrum of example first welder 401 and IX spectrum of example second welder 402. As can be observed, where time is on the vertical axis and frequency is on the horizontal axis, each welder can cause an initial narrow band at a corresponding first frequency. Over time the corresponding interferences can change to a broader band centered at a corresponding relatively lower frequency. Difference between the two example welders interference can also be observer, e.g., the first welder of 401 is shifted to lower relative frequencies than the second welder of 402. Further, the first welder starts earlier in time and the second welder stops later in time. Additionally, the welders have different bandwidths over the course of a weld, although they both display similar time-frequency shapes/patterns. Accordingly, an IX analysis component, e.g., 110-310, etc., can store the characteristics of each welder, the group of welders, etc., e.g., at a data store such as historical IX data store 214, etc. As such, where the characteristics/pattern/signature/fingerprint are stored and an interference later detected at a first time at the example first frequency, a prediction can be determined that the bandwidth will increase and the frequency will shift lower based on the historical 401 spectrum, then a second interference can likely occur corresponding to the 402 spectrum. This prediction can enable adapting a frame to mitigate the anticipated effects of the first and second welders of 401 and 402 beginning a subsequent welding run.

FIG. 4 further illustrates example steady state IX spectrum 403, which can correspond to a time period having a consistent interference. As an example, an industrial microwave dryer can cause an interference that can be steady state for relatively longer periods of time. This can be quite distinct from bursty interference that might be seen with the example welders of 401/402, or from intentional interferes, such as other wireless networks, etc.

Additionally, FIG. 4 illustrates example progressive IX spectrum at a first time 404 and at a second time 405. At the first time, e.g., 404, the interference can be at a first frequency and shift to a lower frequency over a first period of time. However, unlike the welder example in 401/402, over longer periods of time the interference from first time 404 to second time at 405 can shift to a higher frequency before again drifting to a lower frequency. As an example, this can occur in large brushed DC motors that change speeds over longer times and have localized drift in speed over shorter times, e.g., at 404 the example motor could be running at a first speed that slows just a little over the time in the first photo then, at 405, the example motor can be moved to a higher speed at the second time and then drifts to a slightly slower speed in the time frame of the second photo. As in the other examples, this type of pattern/behavior/characteristic/signature/fingerprint would be typically not be found in intentional interference.

At repeating IX spectrum over time 406, of FIG. 4, it can be observed (here time is the horizontal axis and frequency is the vertical axis, that an unintentional interferer can cause interference that is relatively stable in frequency but is intermittent in time. This can be for example, a result of power transmission line contacts switching, which can typically generate a stable frequency event at each switching event.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
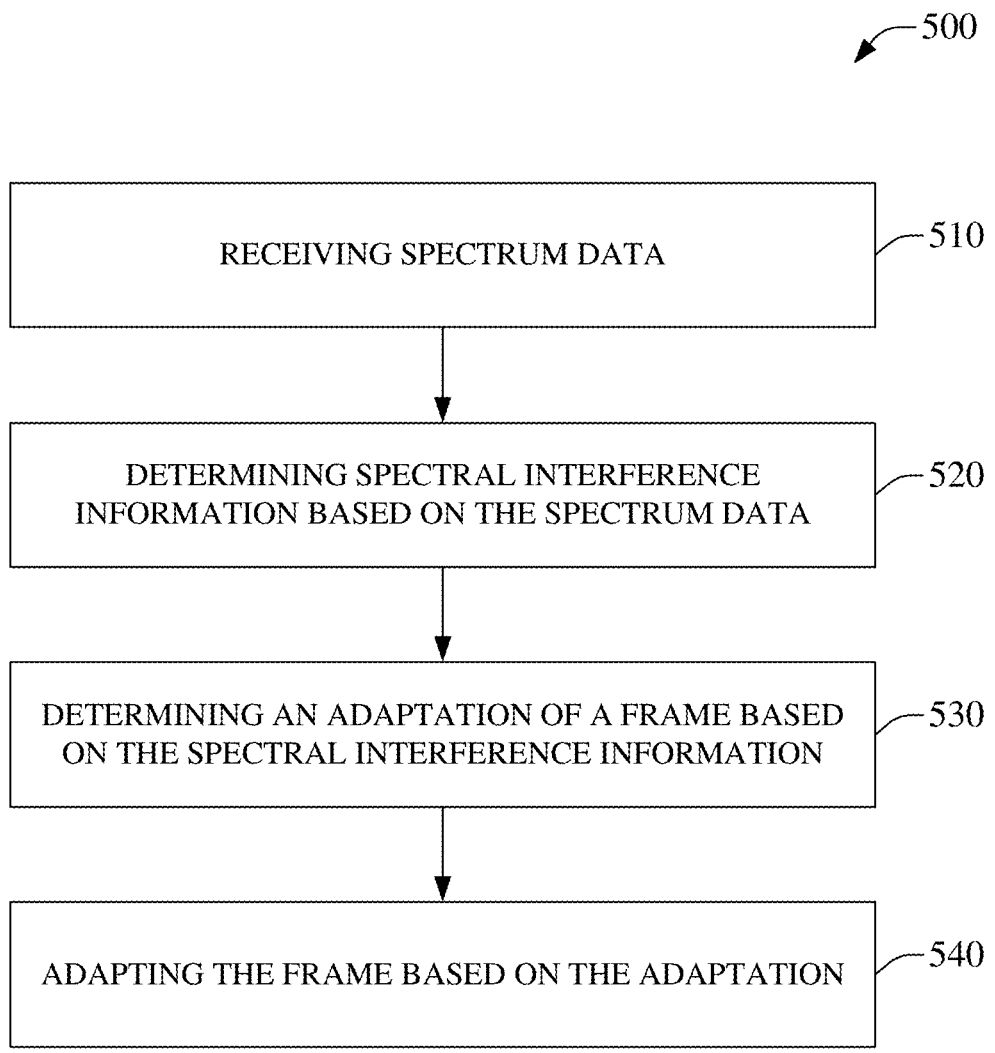
FIG. 5 is an illustration of an example method facilitating mitigation of interference based on analysis of spectrum data, in accordance with aspects of the subject disclosure.

FIG. 5 is an illustration of an example method 500, facilitating mitigation of interference based on analysis of spectrum data, in accordance with aspects of the subject disclosure. At 510, method 500 can comprise receiving spectrum data. In an aspect, spectrum data can comprise IX information corresponding to unintentional interference. Unintentional interference can be associated with characteristics that are typically distinct from intentional interference, e.g., characteristics such as frequency drift, irregular temporal occurrence, wide bandwidths, high power, harmonics, intermodulation effects, etc. As an example, an electrical substation can cause IX with switching events, large electrical motors can generate IX as a function of their operating speed, an automobile manufacturing plant can have a welding assembly line that causes a time shifting IX having an initial narrow bandwidth that becomes broader and shifts over time due to the startup frequency being different than the continuing weld frequency, etc.

At 520, method 500 can comprise determining spectral IX information based on the spectrum data. IX information can be determined embodying IX patterns, IX signatures, IX fingerprints, IX characteristics, etc., wherein the determination can be based on analysis of the spectrum data received at 510. In an aspect, IX information can embody a characteristic of unintentional interference that can correspond to unintentional interference present in an area, e.g., a service coverage area of a wireless network system. As an example, a welding assembly line can generate a plurality of interferences, wherein each interference changes in time, frequency, power, and bandwidth, for example as illustrated at 400 in FIG. 4. The example welding assembly line can comprise, for example, an inference that begins at a higher and narrower frequency that, over time, shifts to a lower and broader frequency, such as 401 or 402 of FIG. 4. This type of changing character can be distinct from typical interferences from intentional interferers.

At 530, method 500 can comprise determining an adaptation of a frame based on the spectral IX information. In an aspect, interference avoidance, mitigation, etc., in regard to unintentional interference can be important in the uplink packet scheduler where the uplink transmission is generally less robust than a corresponding downlink transmission, although the same or similar techniques can also be employed in downlink transmission IX avoidance, mitigation, etc. Adaptation of a frame, PRB, MCS, etc., can be based on the spectral IX information determined at 520, e.g., via analysis of spectrum data received at 510. As an example, it can be determined that elements of a future PRB should avoid the use of particular frequencies due to a likelihood of interference from an unintentional interferer. Frame adaptation can also be determined such that successive future PRBs also do not make use of the same or other frequencies, for example, based on characteristic of an interference that is determined to be likely to change over time, e.g., a large DC motor that historically changes speeds in a manner that suggests a pattern, etc. Where the frequency changes over time, frame adaptation can adapt use of corresponding frequencies in successive future PRBs. In this example, it will be noted that where spectrum data comprises an indication of a change in motor speed, frames corresponding the balance of the predicted motor speed pattern can be mitigated by inferring future interference based on the pattern of motor speed changes such that frame adaption can adapt corresponding successive PRBs accordingly to enable mitigation of interference from the motor. It will further be noted, that where the motor is operating cyclically, in a manner that can be employed to generate an inference relating to future cyclic use, successive cycles of motor interference can also be mitigated by frame adaptation, e.g., the predicted cyclic speed of the motor, not just the remainder of a detected start to a motor speed cycle, can be mitigated based on an inference of the likely upcoming motor speed change cycle and the likely pattern of interference expected during that upcoming cycle.

Method 500, at 540, can facilitate adapting the frame based on the adaptation determined at 530. At this point, method 500 can end. In an aspect, method 500 can facilitate the adapting, for example, by triggering, causing, or provisioning an adaptation of a frame, by providing access to information corresponding to parameters applied in adapting a frame, etc.

Figure 6:
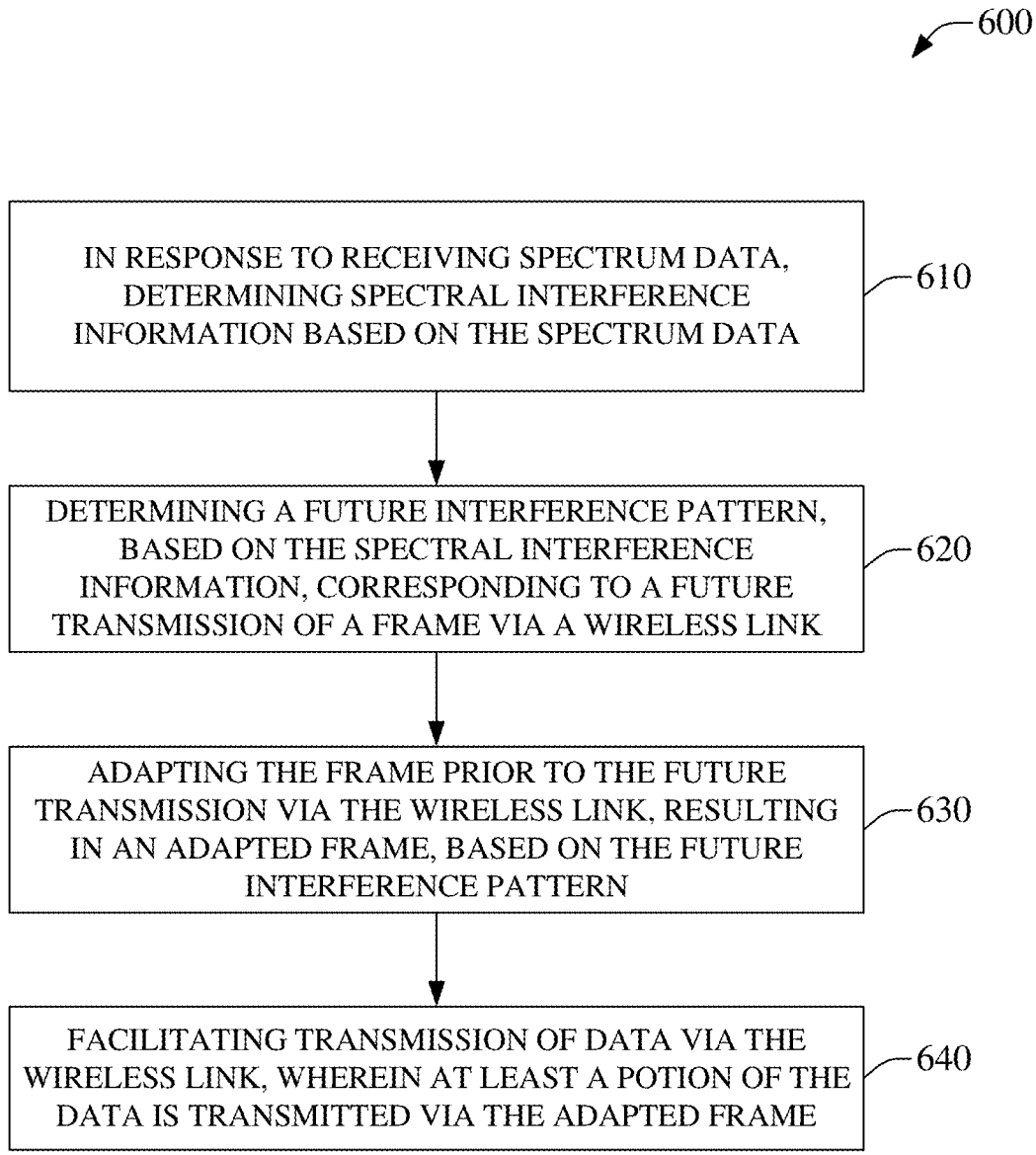
FIG. 6 is an illustration of an example method enabling mitigation of interference based on analysis of spectrum data and prediction of future interference, in accordance with aspects of the subject disclosure.

FIG. 6 is an illustration of an example method 600, which can enable mitigation of interference based on analysis of spectrum data and prediction of future interference, in accordance with aspects of the subject disclosure. At 610, method 600 can comprise determining spectral IX information in response to receiving spectrum data. IX information can be determined embodying IX patterns, IX signatures, IX fingerprints, IX characteristics, etc., wherein the determination can be based on analysis of the spectrum data received at 610. In an aspect, IX information can embody a characteristic of unintentional interference that can correspond to unintentional interference present in an area, e.g., a service coverage area of a wireless network system. Spectral information that indicates a changing character of the IX can be distinct from typical interferences from intentional interferers. Unintentional interference can be associated with characteristics that are typically distinct from intentional interference, e.g., characteristics such as frequency drift, irregular temporal occurrence, wide bandwidths, high power, harmonics, intermodulation effects, etc. As an example, an electrical substation can cause IX with switching events, large electrical motors can generate IX as a function of their operating speed, an automobile manufacturing plant can have a welding assembly line that causes a time shifting IX having an initial narrow bandwidth that becomes broader and shifts over time due to the startup frequency being different than the continuing weld frequency, etc.

At 620, method 600 can comprise determining a future interference pattern, based on the spectral IX information, which can correspond to a future transmission of a frame via a wireless network. Method 600, at 620, can infer or predict a likely future interference pattern based on a spectral IX information corresponding to a current interference and in regard to historical IX patterns, characteristics, signatures, fingerprints, etc. Where a pattern of IX is predicted, a future frame can be adapted accordingly to mitigate the anticipated IX effect.

At 630, method 600 can comprise adapting the frame prior to the future transmission via the wireless link. The adapting can result in an adapted frame. The adapting can be based on the prediction/inference about future IX. This can facilitate mitigation of predicted/inferred unintentional interference. Adaptation of a frame, PRB, MCS, etc., can be based on the future IX pattern determined at 620, e.g., elements of a future PRB can avoid the use of particular frequencies due to a likelihood of a future interference from an unintentional interference source. Where the frequency changes over future time, frame adaptation can adapt use of corresponding frequencies in successive future PRBs.

Method 600, at 640, can facilitate transmission of data via the wireless link. At least a portion of the data can be transmitted via the adapted frame. At this point, method 600 can end. In an aspect, method 600 can facilitate the transmission of the data via the adapted frame, for example, by triggering, causing, or provisioning an adaptation of a frame used to transmit the data; by providing access to information corresponding to parameters applied in adapting a frame that will carry the future data; etc.

Figure 7:
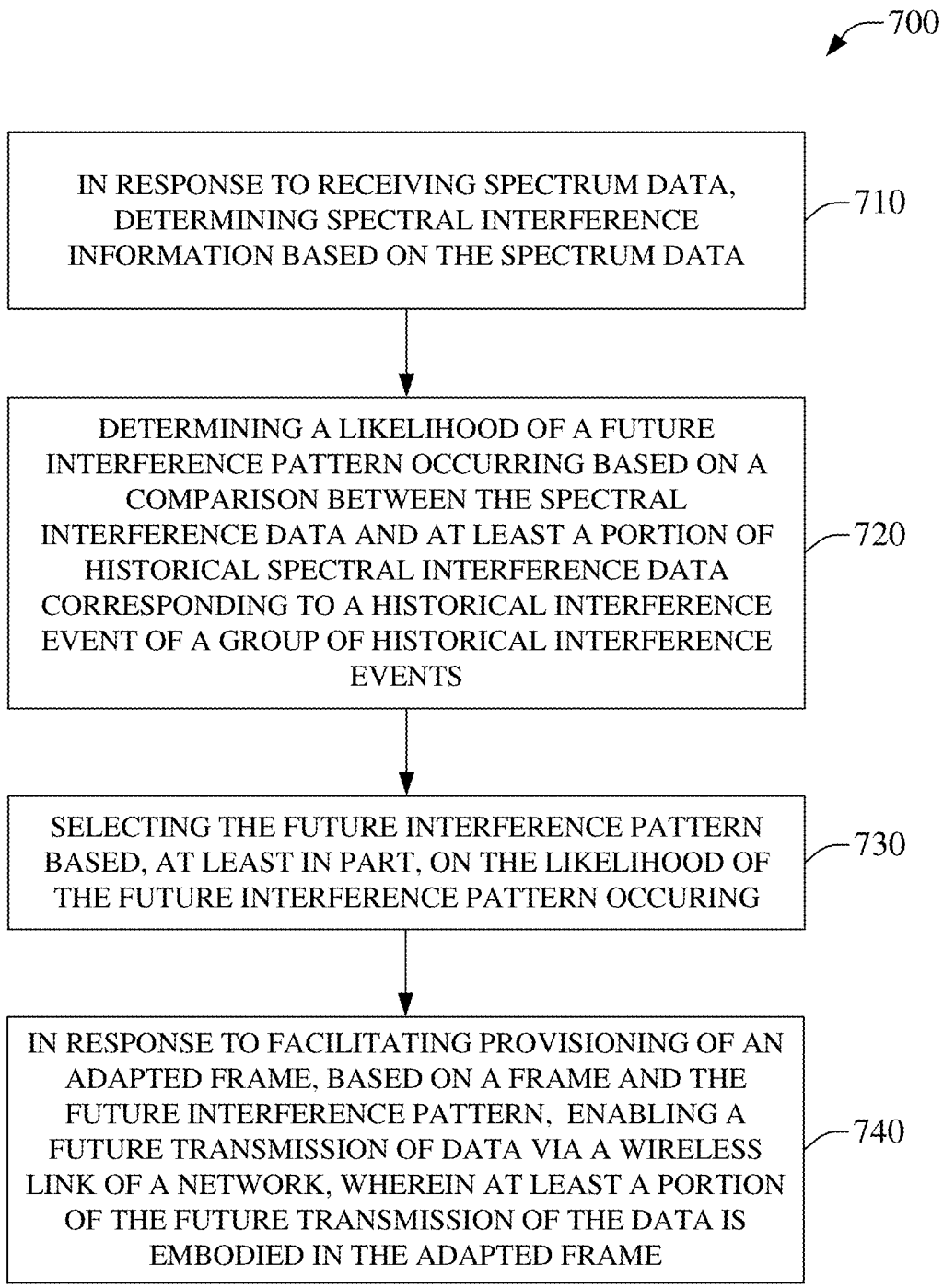
FIG. 7 illustrates an example method enabling mitigation of interference based on analysis of spectrum data and determining a likelihood of a future interference, in accordance with aspects of the subject disclosure.

FIG. 7 illustrates example method 700 that facilitates mitigation of interference based on analysis of spectrum data and determining a likelihood of a future interference, in accordance with aspects of the subject disclosure. Method 700, at 710, can comprise determining spectral IX information in response to receiving spectrum data. IX information can be determined embodying IX patterns, IX signatures, IX fingerprints, IX characteristics, etc., wherein the determination can be based on analysis of the spectrum data received at 710. In an aspect, IX information can embody a characteristic of unintentional interference that can correspond to unintentional interference present in an area, e.g., a service coverage area of a wireless network system. Spectral information that indicates a changing character of the IX can be distinct from typical interferences from intentional interferers. Unintentional interference can be associated with characteristics that are typically distinct from intentional interference, e.g., characteristics such as frequency drift, irregular temporal occurrence, wide bandwidths, high power, harmonics, intermodulation effects, etc.

At 720, method 700 can comprise determining a likelihood of a future IX pattern occurring. The likelihood can be based on a comparison between the spectral IX data and at least a portion of historical spectral IX data. The at least the portion of historical spectral IX data can correspond to a historical IX event of a group of historical IX events. In an embodiment, the group of historical IX events can be accessed at a historical IX event data store, e.g., a catalog of historical IX events, a database of historical IX events, a library of historical IX events, etc. Accordingly, the group of historical IX events can enable comparison of a current interference to see if there is a sufficiently similarity to a historical IX event of the historical IX events. In an embodiment, the more similar the current IX information to at least a portion of the historical IX event, the greater the likelihood that a similar IX event is occurring. As such, where current IX information is a close match to the start of a historical IX event, it can be more likely that the remainder of a current IX event will also be similar to the historical IX event. Thus, the current IX event can be more likely to have a future IX pattern to the historical IX event. Similarly, at least a portion of a previously determined mitigation, corresponding to the likely historical IX event, can be employed to mitigate the future IX event.

At 730, method 700 can comprise selecting the future IX pattern based, at least in part, on the likelihood of the future IX pattern occurring, e.g., based on comparisons to historical IX events. A future interference pattern can correspond to a future transmission of a frame via a wireless network. Method 700, at 720, can infer or predict a likely future interference pattern based on current spectral IX information and on historical IX patterns, characteristics, signatures, fingerprints, etc. Where a pattern of IX is predicted, a future frame can be adapted accordingly to mitigate the anticipated IX effect.

At 740, method 700, in response to facilitating provisioning of an adapted frame, can comprise enabling a future transmission of data via a wireless link of a network. The adapted frame can be based on a frame and the future IX pattern selected at 730. This can facilitate mitigation of predicted/inferred unintentional interference. Adaptation of a frame can result in elements of a future PRB avoiding the use of particular frequencies due to a likelihood of a future interference from an unintentional interference source. Where the frequency changes over future time, frame adaptation can adapt use of corresponding frequencies in successive future PRBs. At least a portion of the data can be transmitted via the adapted frame. At this point, method 700 can end. In an aspect, method 700 can facilitate the transmission of the data via the adapted frame, for example, by triggering, causing, or provisioning an adaptation of a frame used to transmit the data; by providing access to information corresponding to parameters applied in adapting a frame that will carry the future data; etc.

Figure 8:
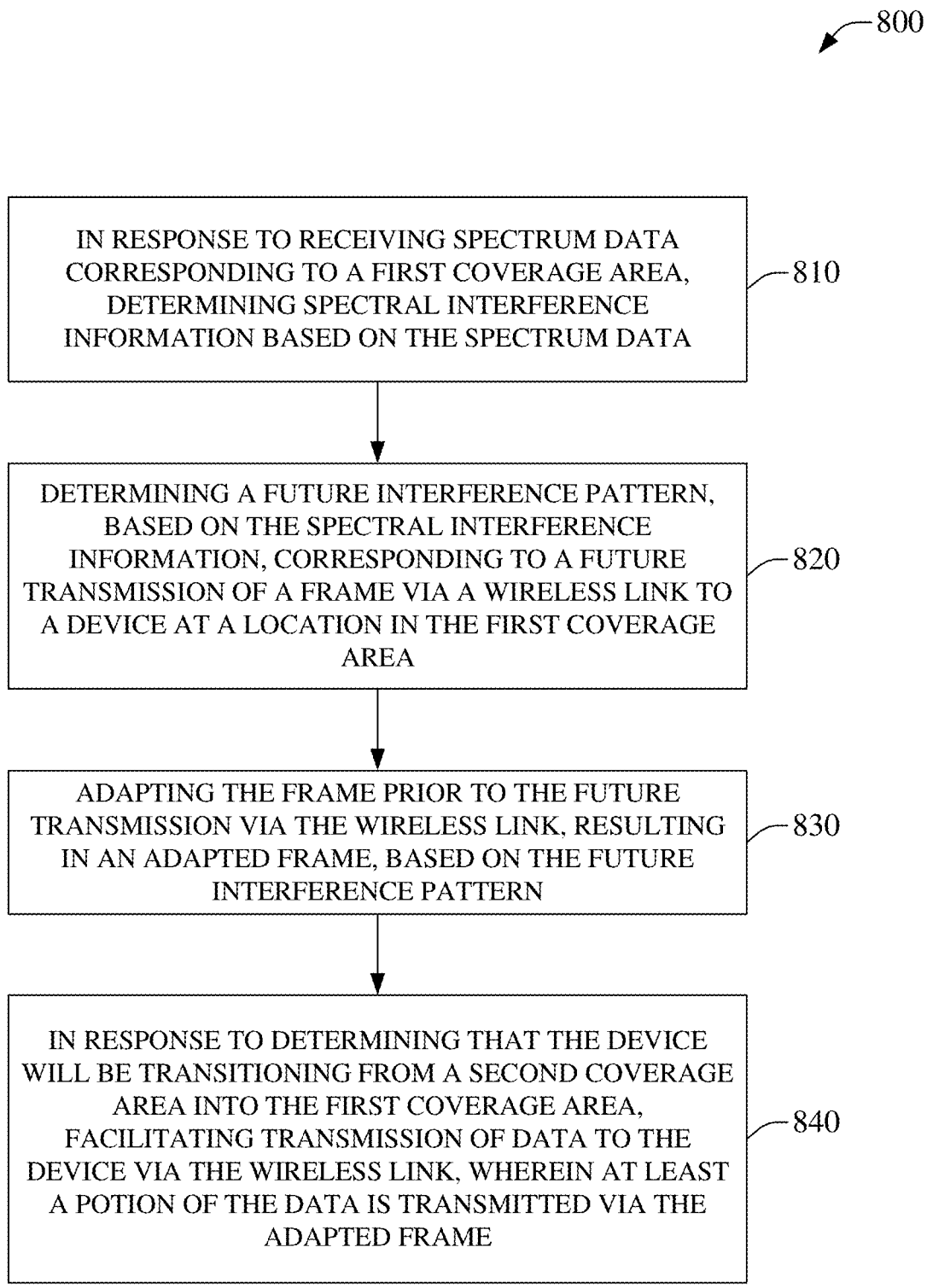
FIG. 8 illustrates an example method enabling mitigation of interference based on spectrum data corresponding to different coverage areas, in accordance with aspects of the subject disclosure.

FIG. 8 illustrates example method 800, which can enable mitigation of interference based on spectrum data corresponding to different coverage areas, in accordance with aspects of the subject disclosure. Method 800, at 810, can comprise determining spectral IX information in response to receiving spectrum data corresponding to a first coverage area of a wireless network. Spectral IX information can be determined embodying IX patterns, IX signatures, IX fingerprints, IX characteristics, etc., wherein the determination can be based on analysis of the first coverage area spectrum data. In an aspect, IX information can embody a characteristic of unintentional interference that can correspond to unintentional interference present in the first coverage area, e.g., a service coverage area of a wireless network system. Spectral information that indicates a changing character of the IX can be distinct from typical interferences from intentional interferers. Unintentional interference can be associated with characteristics that are typically distinct from intentional interference, e.g., characteristics such as frequency drift, irregular temporal occurrence, wide bandwidths, high power, harmonics, intermodulation effects, etc.

At 820, method 800 can comprise determining a future IX pattern. The future IX pattern can be determined based on the current spectral IX information. Moreover the furfure IX pattern can correspond to a future transmission of a frame via a wireless link to a device at a location in the first coverage area.

At 830, method 800 can comprise adapting the frame prior to the future transmission via the wireless link. The adapting can result in an adapted frame. The adapting can be based on the prediction/inference about future IX pattern. This can facilitate mitigation of predicted/inferred unintentional interference. Adaptation of a frame can be based on the future IX pattern determined at 820, e.g., elements of a future PRB can avoid the use of particular frequencies due to a likelihood of a future interference from an unintentional interference source. Where the frequency changes over future time, frame adaptation can adapt use of corresponding frequencies in successive future PRBs.

At 840, method 800 can comprise facilitating transmission of data to the device via the wireless link. In an aspect, at least a portion of the data can be transmitted via the adapted frame. At this point, method 800 can end. The facilitating the transmission can be in response to determining that the device will transition from a second coverage area into the first coverage area. Where a device will enter into a coverage area with an anticipated interference, from another coverage area with different interference, a frame can be adapted to enable mitigation of IX effects after the transition of the device into the new coverage area.

Figure 9:
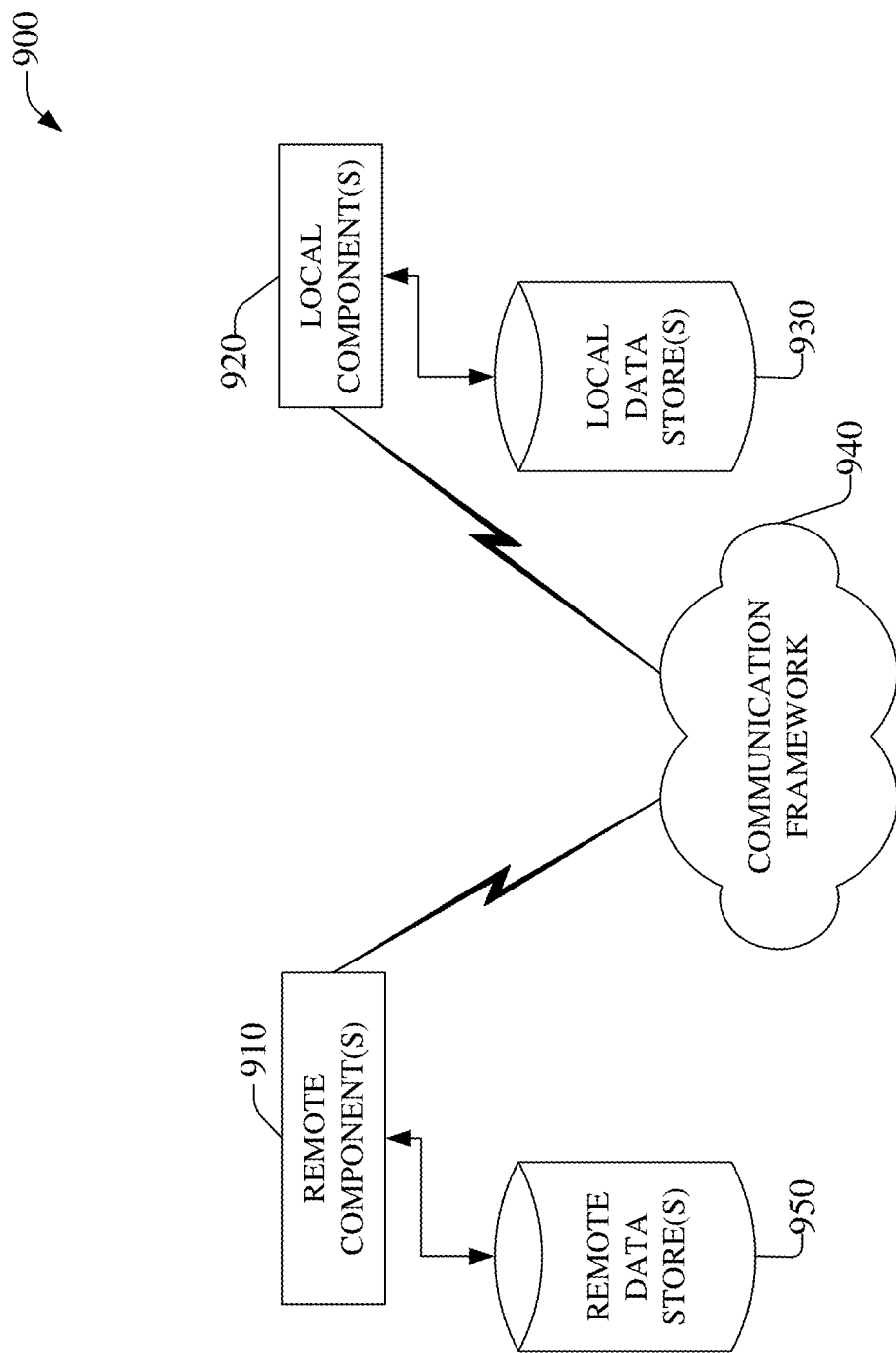
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s)

910 can comprise frame allocation component(s) 130, 230, etc., UE 340, 350, etc., RAN 341, 351, etc., AP 343, 353, etc.

The system 900 also comprises one or more local component(s) 920. The local component(s) 920 can be hardware and/or software (e.g., threads, processes, computing devices). In some embodiments, local component(s) 920 can comprise IX analysis component 110, 210, 310, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, frame adaptation information 104, 204, 304, etc., can be received from corresponding remoted components.

Figure 10:
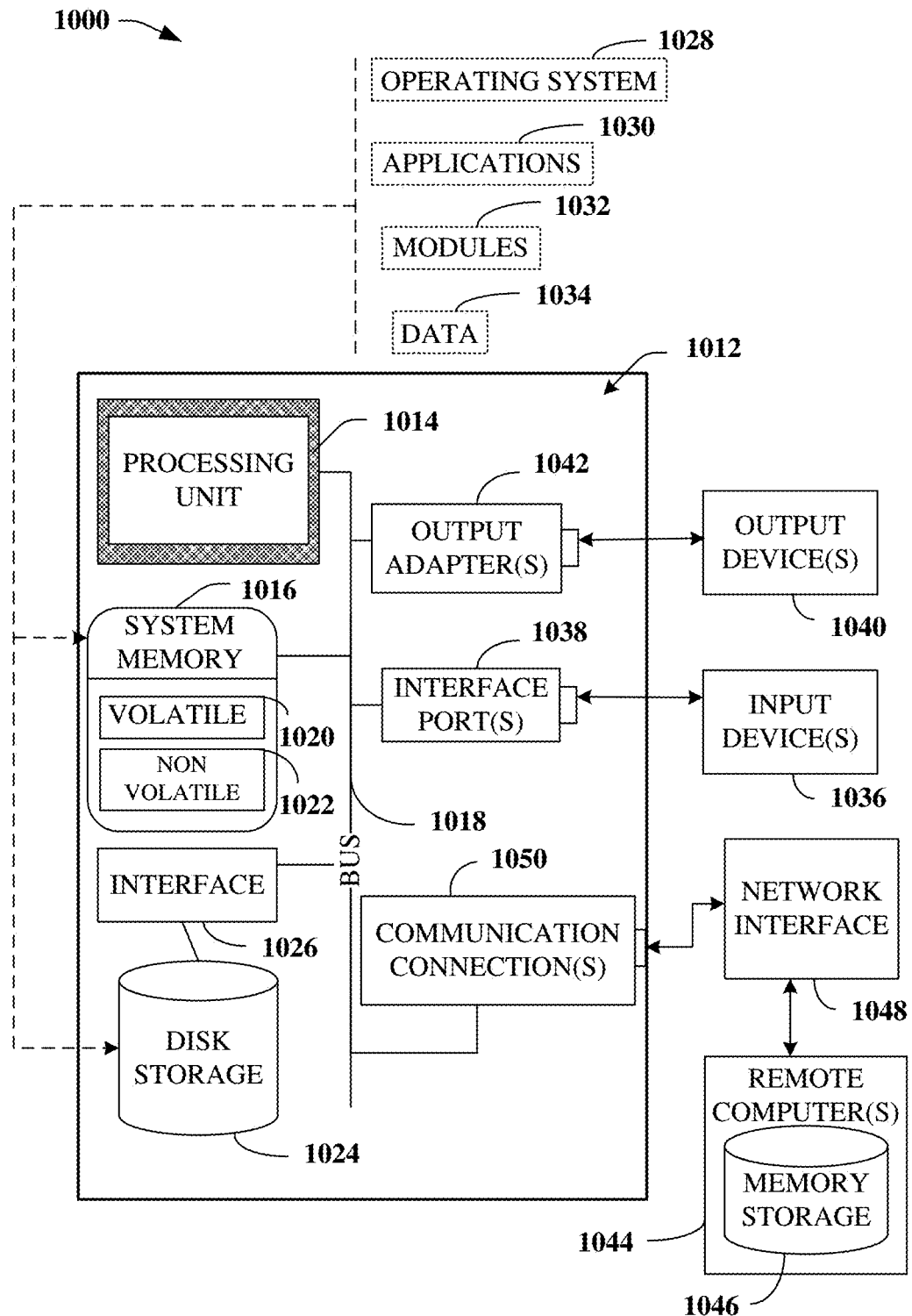
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in IX analysis component 110, 210, 310, etc., frame allocation component 130, 230, etc., UE 340, 350, etc., RAN 341, 351, etc., AP 343, 353, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, memristors, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising receiving, by IX analysis component 110, 210, 310, etc., spectrum data 102-202, etc.; determining an interference pattern, and adjusting allocation of physical resources, based on a future spectral interference.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is typically intended to mean an inclusive "or" rather than an exclusive "or." That is, unless specified otherwise, or clear from context, "X employs A or B" is intended to mean any of the natural inclusive permutations. That is, if X employs A alone, X employs B alone, X employs C alone, X employs A and B alone, X employs B and C alone, X employs A and C alone, or X employs A and B and C, then "X employs A, B or C" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A but not aspect B, and a second embodiment that has aspect B but not aspect A, does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
a processor; and
a memory that stores executable instructions that, when executed by the processor, facilitate performance of operations, comprising:
concurrently with receiving spectral information corresponding to an area of wireless coverage, determining whether the spectral information comprises an unintentional interference from an interference source external to network equipment enabling the area of wireless coverage;
in response to the spectral information being determined to comprise the unintentional interference, determining an interference pattern exhibited by the spectral information; and
in response to predicting a future spectral interference based on the interference pattern, adjusting an allocation of physical resources corresponding to the area of wireless coverage.

2. The device of claim 1, wherein the operations further comprise, in response to the interference pattern being determined to comprise successive cycles of cyclic interference, adjusting the allocation of physical resources comprises mitigating the successive cycles of cyclic interference.

3. The device of claim 1, wherein adjusting the allocation of physical resources comprises preventing a modification of the allocation of physical resources in response to the spectral information being determined to be unlikely to cause a transmission error in the area of wireless coverage.

4. The device of claim 1, wherein the unintentional interference emanates from a welding machine.

5. The device of claim 1, wherein the operations further comprise, in response to the future spectral interference being predicted to shift frequencies over a period of time, adjusting the allocation of physical resources mitigates the shift in frequencies over the period of time.

6. The device of claim 1, wherein the allocation of physical resources is sent to a mobile device prior to the mobile device entering the area of wireless coverage.

7. The device of claim 1, wherein the unintentional interference emanates from an electric motor, and wherein predicting the future spectral interference comprises predicting a cyclic speed of the electric motor.

8. The device of claim 1, wherein adjusting the allocation of physical resources comprises adjusting a physical resource block or adjusting a frame structure.

9. The device of claim 1, wherein the area of wireless coverage is a first area of wireless coverage for a first period of time, and wherein the spectral information corresponds to a second area of wireless coverage, different from the first area of wireless coverage, for a second period of time.

10. The device of claim 9, wherein the first period of time is a different period of time than the second period of time.

11. The device of claim 9, wherein the second area of wireless coverage is a neighboring area to the first area of wireless coverage.

12. A method, comprising:
concurrently with receiving spectral information corresponding to an area of network coverage, determining, by a system comprising a processor, that the spectral information comprises an unintentional interference from an interference source external to network equipment enabling the area of network coverage;
determining, by the system, a future interference pattern based on the spectral information; and
in response to determining the future interference pattern, provisioning, by the system, a future data frame corresponding to a future transmission of data to the area of network coverage.

13. The method of claim 12, wherein the area of network coverage is a first area of network coverage, and wherein provisioning the future data frame occurs after a transition of a user equipment from a second area of network coverage to the first area of network coverage.

14. The method of claim 12, wherein provisioning the future data frame comprises configuring a future resource block to avoid the use of a frequency corresponding to the future interference pattern.

15. The method of claim 12, wherein provisioning the future data frame comprises provisioning an uplink signal path future data frame.

16. The method of claim 12, wherein receiving the spectral information is via a user equipment proximate to the area of network coverage.

17. A non-transitory machine-readable medium, comprising executable instructions that, when executed by a processor, facilitate performance of operations, comprising:
determining, while receiving spectral information corresponding to an area of network coverage, that the spectral information comprises an unintentional interference from an unintentional interference source external to network equipment enabling the area of network coverage;
in response to determining that the spectral information comprises the unintentional interference, determining a future interference pattern based on the spectral information corresponding to the unintentional interference source and based on historical spectral information;
in response to determining the future interference pattern, provisioning a physical resource block corresponding to a future transmission of data to mitigate an interfering effect of the unintentional interference source; and
facilitating the future transmission of the data, wherein at least a portion of the data is embodied in the physical resource block.

18. The non-transitory machine-readable medium of claim 17, wherein the historical spectral information corresponds to a historical interference event.

19. The non-transitory machine-readable medium of claim 18, wherein the operations further comprise:
comparing the spectral information to the historical interference event; and
determining whether a portion of the spectral information corresponds to a portion of the historical interference event.

20. The non-transitory machine-readable medium of claim 19, wherein provisioning the physical resource block comprises provisioning a portion of a previously determined mitigation corresponding to the historical interference event in response to the portion of the spectral information being determined to correspond to the portion of the historical interference event.

* * * * *